US011261985B1

(12) United States Patent
Duffin et al.

(10) Patent No.: US 11,261,985 B1
(45) Date of Patent: Mar. 1, 2022

(54) GAS VALVE

(71) Applicant: XCAD VALVE AND IRRIGATION, INC., Paul, ID (US)

(72) Inventors: Don Duffin, Paul, ID (US); Roger Duffin, Paul, ID (US); Casey Nutt, Paul, ID (US)

(73) Assignee: XCAD Valve and Irrigation, Inc., Paul, ID (US)

( * ) Notice: Subject to any disclaimer, the term of this patent is extended or adjusted under 35 U.S.C. 154(b) by 0 days.

(21) Appl. No.: 17/329,516

(22) Filed: May 25, 2021

(51) Int. Cl.
*F16K 24/04* (2006.01)
*F16K 31/22* (2006.01)
*F16K 47/00* (2006.01)

(52) U.S. Cl.
CPC ............ *F16K 24/044* (2013.01); *F16K 31/22* (2013.01); *F16K 47/0111* (2021.08)

(58) Field of Classification Search
CPC ........ F16K 24/044; F16K 31/22; F16K 33/00; F16K 47/0111
See application file for complete search history.

(56) References Cited

U.S. PATENT DOCUMENTS

| 257,853 | A | * | 5/1882 | Dibble | F16K 24/044 |
| | | | | | 137/202 |
| 785,594 | A | * | 3/1905 | Crispin | F16K 24/044 |
| | | | | | 137/202 |
| 4,209,032 | A | * | 6/1980 | Drori | F16K 24/042 |
| | | | | | 137/202 |
| 2007/0267067 | A1 | * | 11/2007 | Pan | B63C 11/205 |
| | | | | | 137/433 |

FOREIGN PATENT DOCUMENTS

GB          298754 A  * 10/1928  ............. F16K 31/22

* cited by examiner

*Primary Examiner* — Hailey K. Do
(74) *Attorney, Agent, or Firm* — Shaver & Swanson, LLP; Scott D. Swanson

(57) ABSTRACT

An improved gas vent having a body defining a float chamber. A float is positioned within the float chamber. The float chamber defines a passageway for gas to flow from an first port to an outflow port. A float is positioned within the float chamber. The float is configured to move toward a closed position as the fluid level within the float chamber increases. As the fluid level increases the float raises and seals against an interior of the gas vent, preventing further fluid flow through the vent. A shield is positioned between the float and the first port. The shield is configured to deflect gas flow around the shield and float to prevent the float from raising prematurely in response to high velocity gas flow on the float.

11 Claims, 11 Drawing Sheets

GAS VALVE

TECHNICAL FIELD

The presently disclosed technology relates to a gas valve. More particularly, the present invention is an improved gas valve for venting gas when filling a liquid system and allowing gas to enter the system when draining liquid from the system.

BACKGROUND

Irrigation systems are typically drained during the off season. Many of these irrigation systems have a main line with distribution lines emanating from the main line. Water distributors, such as sprinkler heads are positioned on or emanate from the secondary lines. When the irrigation lines are filled, air must be vented from the irrigation lines (also called pipelines). Accordingly, vents are typically positioned along the irrigation lines. These vents typically have a float that raises and seals the vent once the air has been released from the vent and the vent has filled with water. However, these vents have a tendency to close before all the air has been released because the float will often raise and seal in response to high velocity air being forced through the air vent due to the sudden inflow of water into the system in large volumes when the system is initially turned on. This high velocity air creates a force on the float by impinging directly on the bottom of the float and on any non-smooth surfaces on the sides of the float, and by drag created by the air flowing along the side of the float. The vent prematurely closing can lead to the problem of air being stuck in the line which leads to decreased water flow and can cause damaging water hammer to occur in the system. Attempts have been made to prevent the float from blowing closed prematurely by limiting the amount of air that can pass through the vent which can severely affect the performance of the vent, or by shielding the bottom of the float which still leaves the float susceptible to blowing closed due to shear force from the air and impingement on any non-smooth surfaces. Accordingly, what is needed is an improved vent that does not prematurely close due to airflow (or generically, gas flow) forcing the float into the closed position.

SUMMARY OF THE DISCLOSURE

The purpose of the Summary is to enable the public, and especially the scientists, engineers, and practitioners in the art who are not familiar with patent or legal terms or phraseology, to determine quickly from a cursory inspection, the nature and essence of the technical disclosure of the application. The Summary is neither intended to define the inventive concept(s) of the application, which is measured by the claims, nor is it intended to be limiting as to the scope of the inventive concept(s) in any way.

A gas vent valve for use with a pipeline is disclosed. The pipeline defines an internal fluid flow path. The gas vent attaches to the pipeline to allow for venting of gas within the pipeline as the pipeline fills with liquid. The gas vent has a housing. The housing defining a float chamber configured for fluid flow therethrough. The housing having a top end and a bottom end. The bottom end defining a first port to said float chamber and the top end defining a second port to the float chamber. The bottom end being configured for attachment to the pipeline such that the float chamber is in fluid connection with the internal fluid flow path of the pipeline. The housing can be formed in two or more pieces. The housing can be formed with a body having a cap. Alternatively the body can be separate from both the cap and a base. Alternatively different configurations of the housing can be utilized. Preferably in multi component configurations the components are attached by threaded attachment.

A float is positioned in the float chamber. The float is configured to be axially displaceable within the housing between a closed position and an open position. In the closed position the float is sealingly engaged with a sealing seat of the housing. In the open position the float is disengaged from the sealing seat. The float has a body and defines a length. The float is configured to move from the open position to the closed position as the liquid level in the housing increases. The float is configured to move from the closed position to the open position in response to liquid level in said housing decreasing. Preferably the float comprises a seal, such as an o-ring, positioned at a first end of the float.

A shield is positioned between the float and the first port. The shield has a substantially closed first end and an open second end. The term substantially closed means sufficient to deflect gas flow away from the bottom of the float but can include drainage openings to allow liquid draining through the shield. Preferably the closed first end is formed in a conical shape. The conical chape can have a rounded point. The closed first end of the shield is positioned between the first end of the float and the first port. The shield extends from the first end toward the top end of the housing. The shield is configured to prevent airflow from the first port from lifting the float into the closed position. The shield can be integrally formed with the housing or a separate component. In a preferred embodiment the float has a cylindrical body. The shield circumvolves the cylindrical body of the float and extends the length of the float.

The shield preferably has two opposing shield channels. The channels can be utilized for guiding fins on the sides of the float. The channels can be configured for positioning the shield with the housing by positioning the shield channels onto channels in the interior of the housing. The fins of the float are configured for travel in the shield channels and/or the inner channels of the housing when the float is axially displaced in the float chamber.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature

DETAILED DESCRIPTION OF THE PREFERRED EMBODIMENTS

Figure 1:
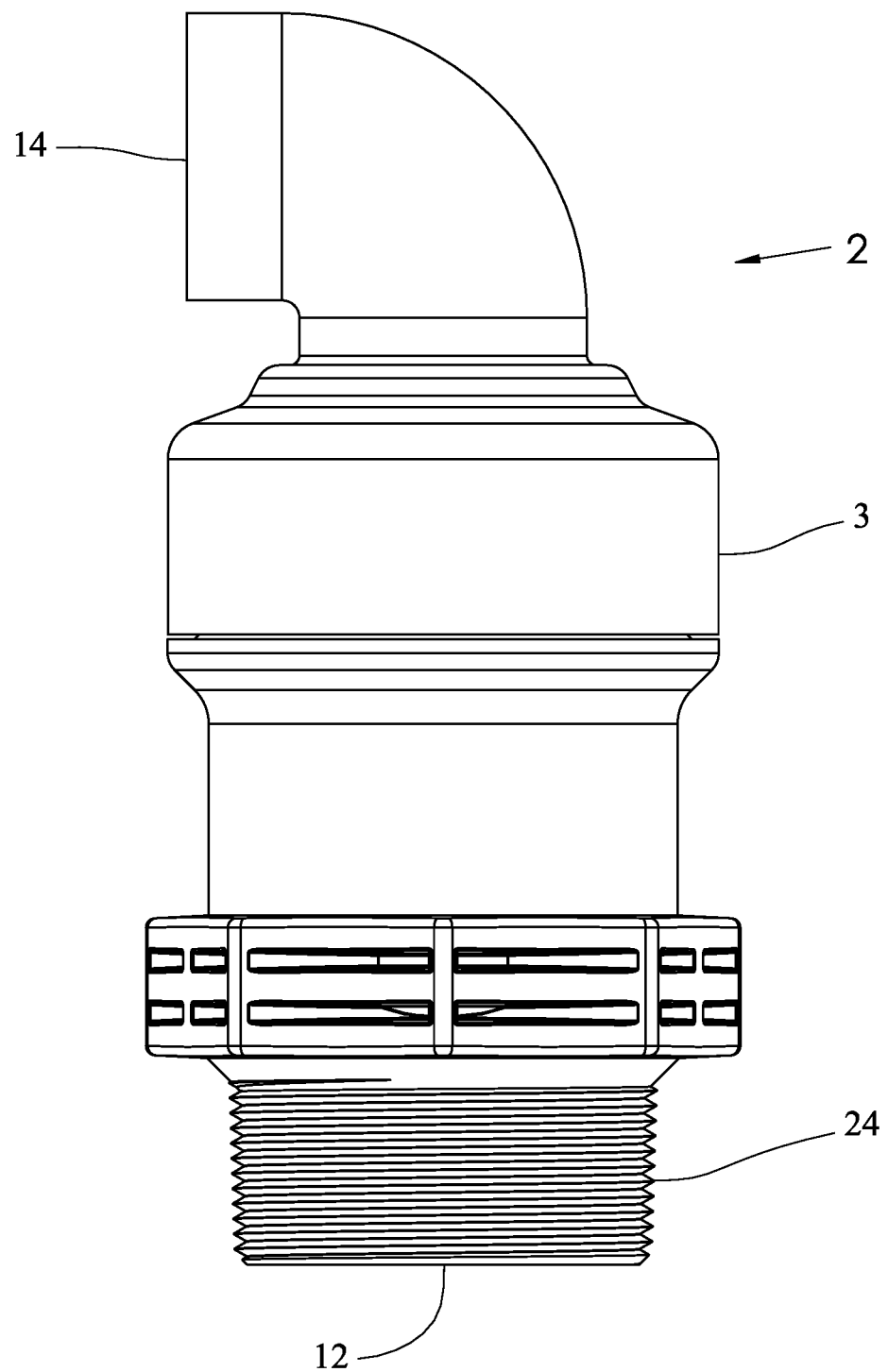
FIG. 1 is a front view of a gas vent.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

FIG. 1 illustrates a front view of the housing 3 of a gas vent valve 2. The depicted housing has a first port 12 and a second port 14 that are in fluid connection such that fluid can flow in either port, through the housing, and out the opposite port. The housing is configured for connection to a to a pipeline or other fluid transfer or storage device or system to which air or other gas may need to be removed as the device fills with liquid. For example, the valve can be utilized to vent air from an irrigation line as the irrigation line fills with water. When the irrigation line is drained, the valve allows air to enter the irrigation line to prevent a vacuum from occurring in the line. In the depicted embodiment the gas vent valve is configured for threaded engagement to a pipeline or other fluid transfer or storage device or system.

Figure 2:
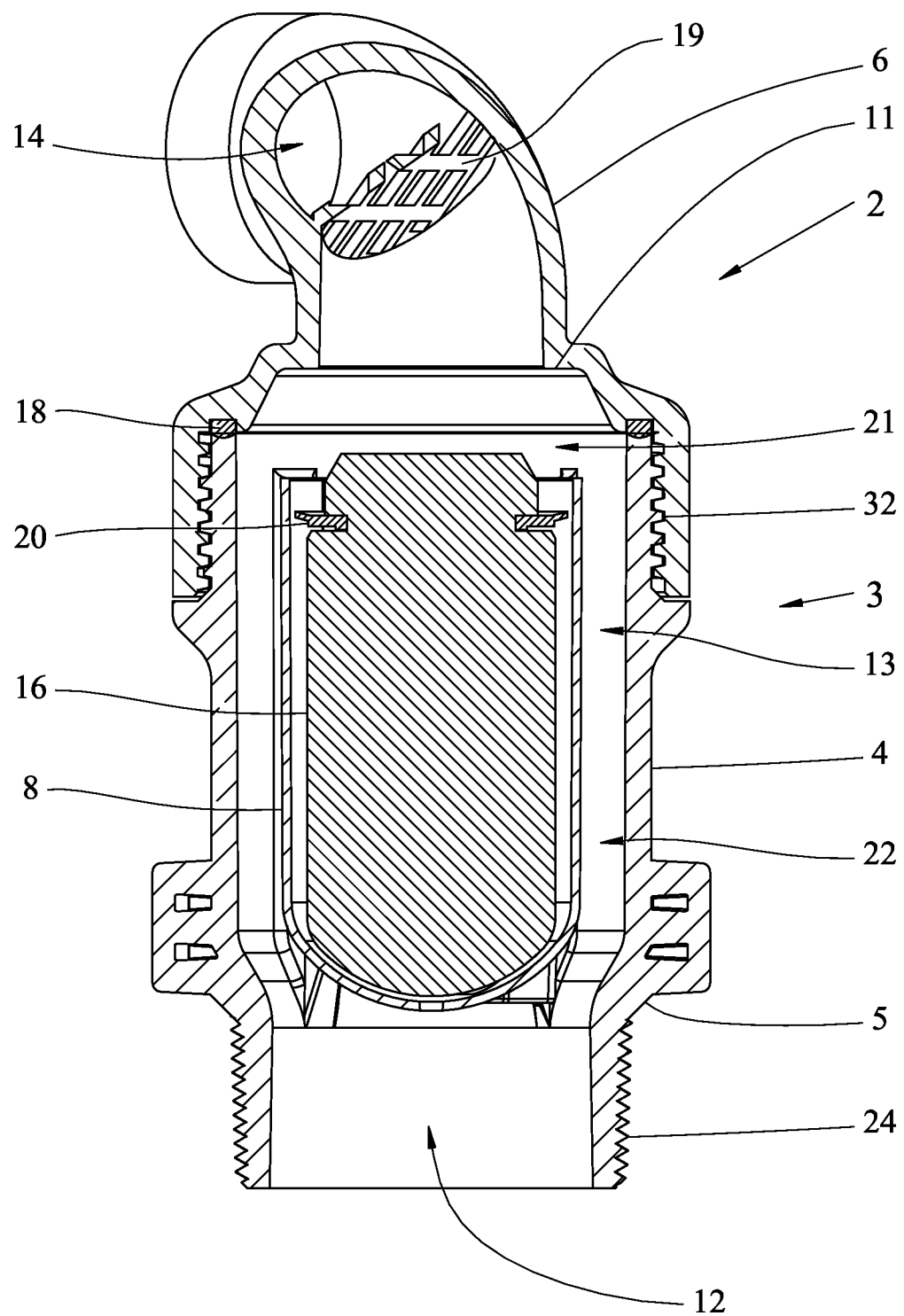
FIG. 2 is a section view of the gas vent of FIG. 1.

FIG. 2 illustrates a section view of the preferred embodiment of a gas vent valve 2. The gas vent valve has a housing 3 having a body 4, a cap 6, and a base 5 integral with the body. The cap is threadingly connected 32 to the body. A seal, such as the depicted o-ring 18 is positioned between the cap and the body to provide a fluid tight connection between the cap and the body. A screen 19 is positioned within the cap to prevent unwanted material from entering the vent.

The housing defines a float chamber 13. A first port 12 and second port 14 are in fluid connection via the float chamber 13. The first port is positioned in the base of the housing and the second port is positioned within the cap. The base is threaded 24 for attachment to a device or system to be vented.

The first port is configured such that gas from the pipeline or other device enters the first port 12, flows up through the float chamber 13 and out the second port 14 of the cap. A float 16 is positioned within the float chamber. The float is configured to raise or float upward as liquid, such as irrigation water, enters the valve from the first port 12. The float has a seal 20 that is configured to seal against a seal seat 11. When sufficient fluid has entered the system to float the float upward, the seal 20 seats against the seal seat 11 thus preventing outflow from the first port through the float chamber and out the second port.

A shield 8 is provided that shields the base and sides of the float 16 from gas flow entering the first port 12 and flowing through the float chamber of the valve and out the second port 14. The shield prevents the gas flow from imparting a lifting force to the float directly to the base of the float or alternatively as drag on the body of the float as the gas travels around the float. Instead, the shield deflects this gas flow around the float in passage 22 and out the second port 14. The shield is depicted with a conical first end and an open second end and circumvolving the cylindrical body of the float. The shield can include A believed further benefit of this construction is recirculation of gas caused by the gas flow past the end of shield. The recirculation in area 21 of the float chamber causes a downward force on the float, preventing premature raising of the float and thus premature sealing of the vent, thus ensuring proper valve function.

Figure 3:
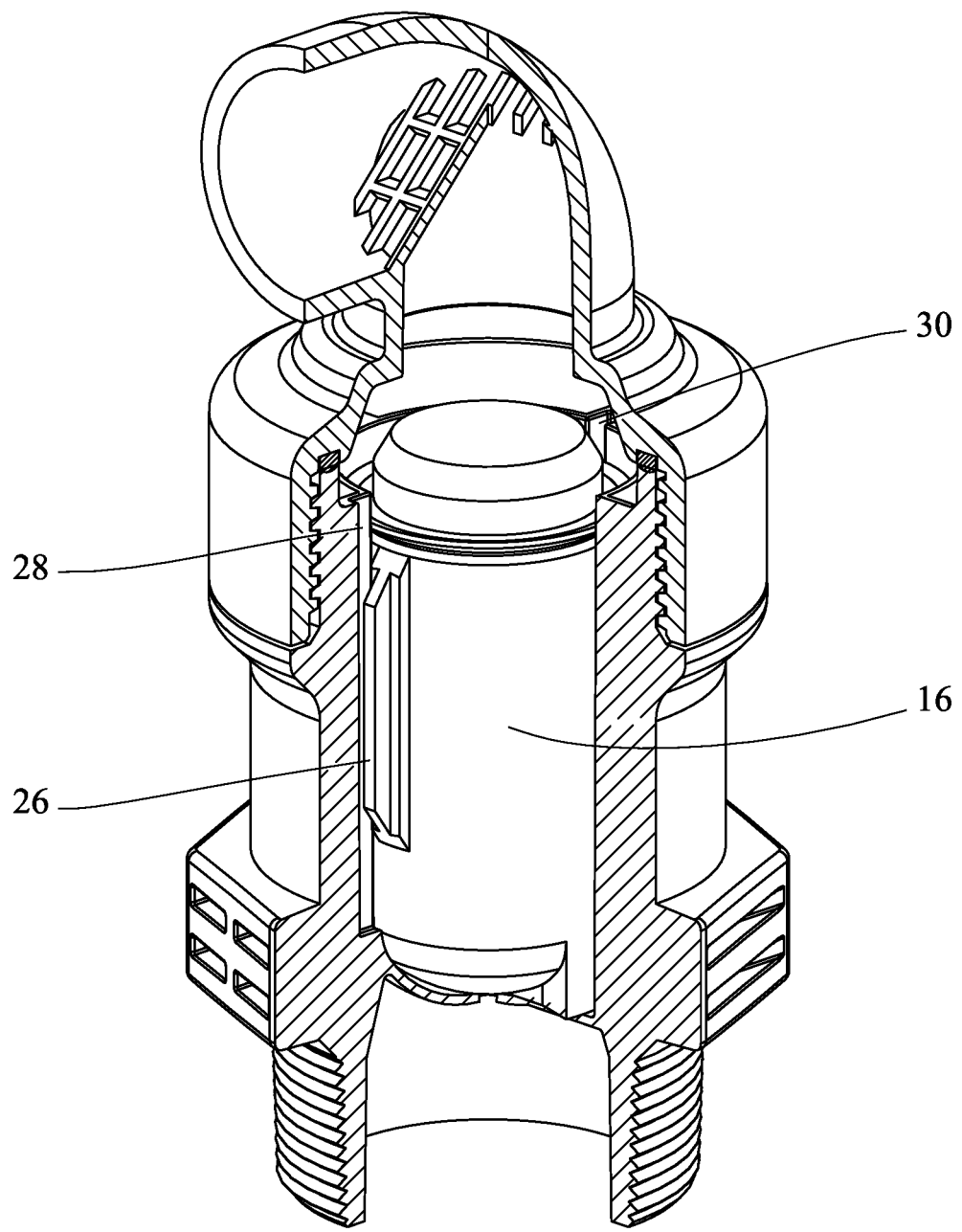
FIG. 3 is a partial section view of the gas vent shown in FIGS. 1-2.

FIG. 3 illustrates a partial section view of the valve of FIG. 2. The float 16 has two opposing fins positioned on the body of the float. A first fin 26 is illustrated with the second hidden in the view by the body of the float. The fins of the float are positioned in channels 28, 30 that serve as positioning guides as the float moves axially in the float chamber.

Figure 4:
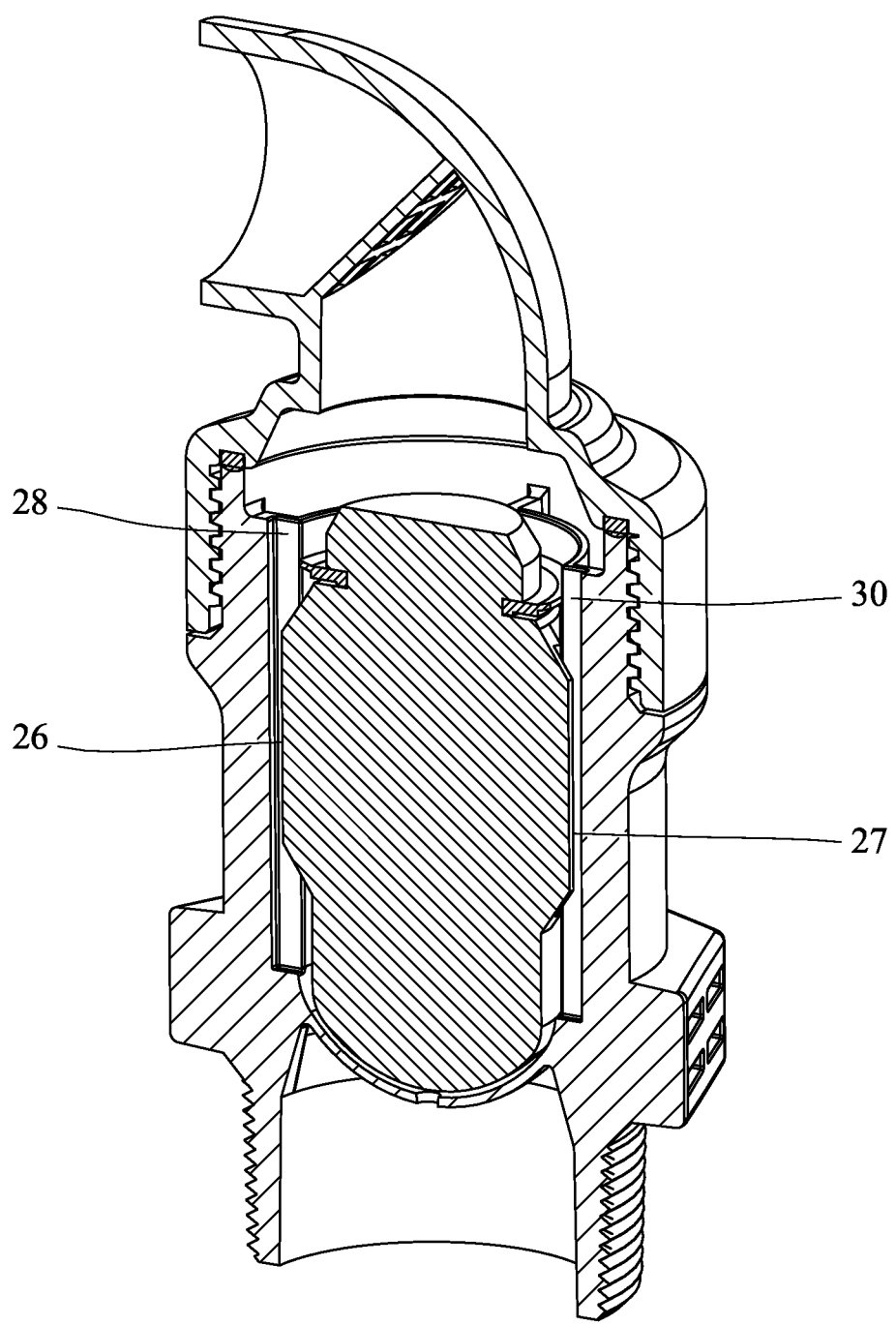
FIG. 4 is a section view of the gas vent shown in FIGS. 1-3.

FIG. 4 is a section view of the valve of FIGS. 2-3. FIG. 4 illustrates the two opposing fins 26, 27 of the float positioned in channels 28, 30 of the shield.

Figure 5:
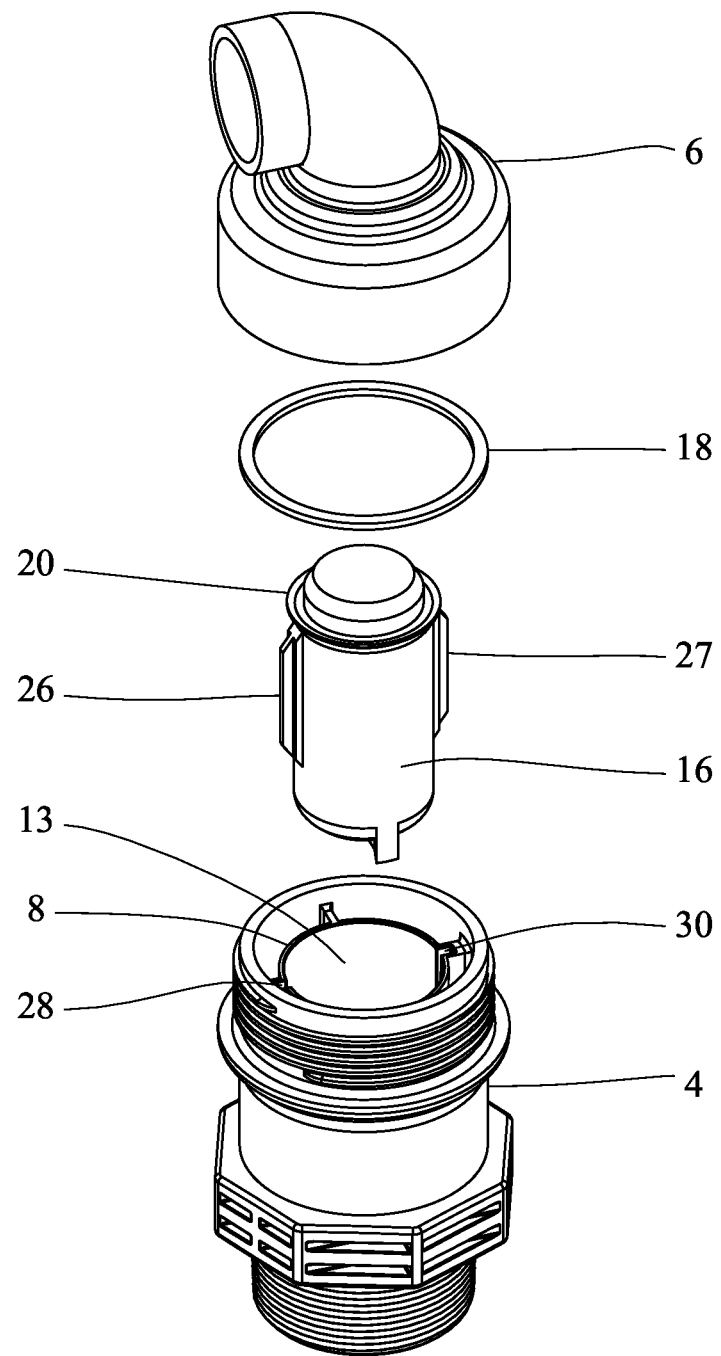
FIG. 5 is an exploded view of the gas vent shown in FIGS. 1-4.

FIG. 5 is an exploded view of the valve of FIGS. 2-4. FIG. 5 illustrates cap 6, seal 18, float 16 having opposing fins 26, 27 and float seal 20. The shield 8 is integrally formed in the body 4. The shield has opposing channels 28, 30 in which the fins 26, 27 of the float are positioned.

Figure 6:
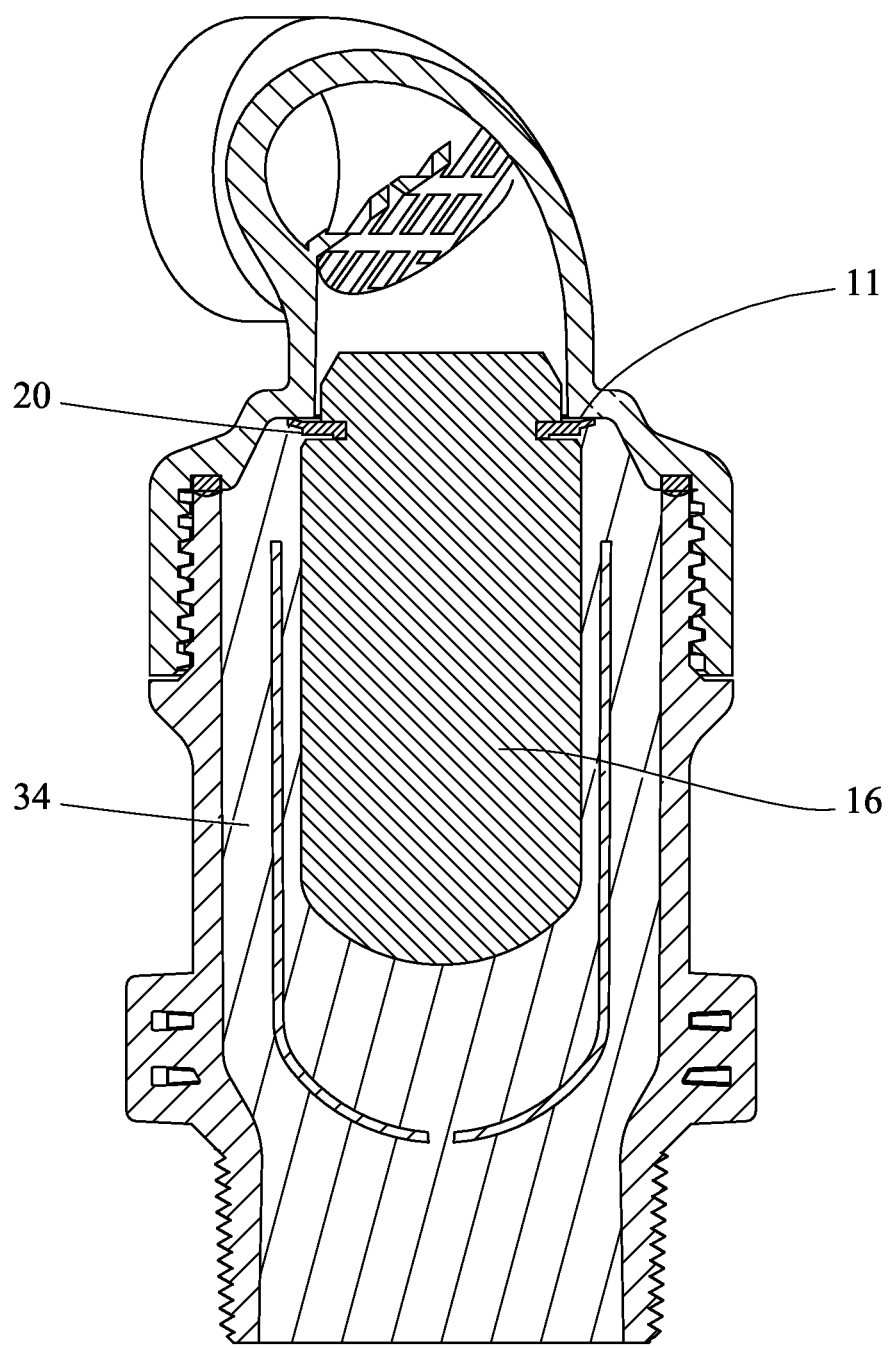
FIG. 6 is a section view of the gas vent shown in FIGS. 1-5 having illustrating liquid causing the float to seal the gas vent.

FIG. 6 is a section view of the valve of FIGS. 2-5 in which fluid 34 has filled the float chamber, causing the float to rise to a closed position. The seal 20 is seated against the seal seat 11 preventing fluid flow out the second port of the valve.

Figure 7:
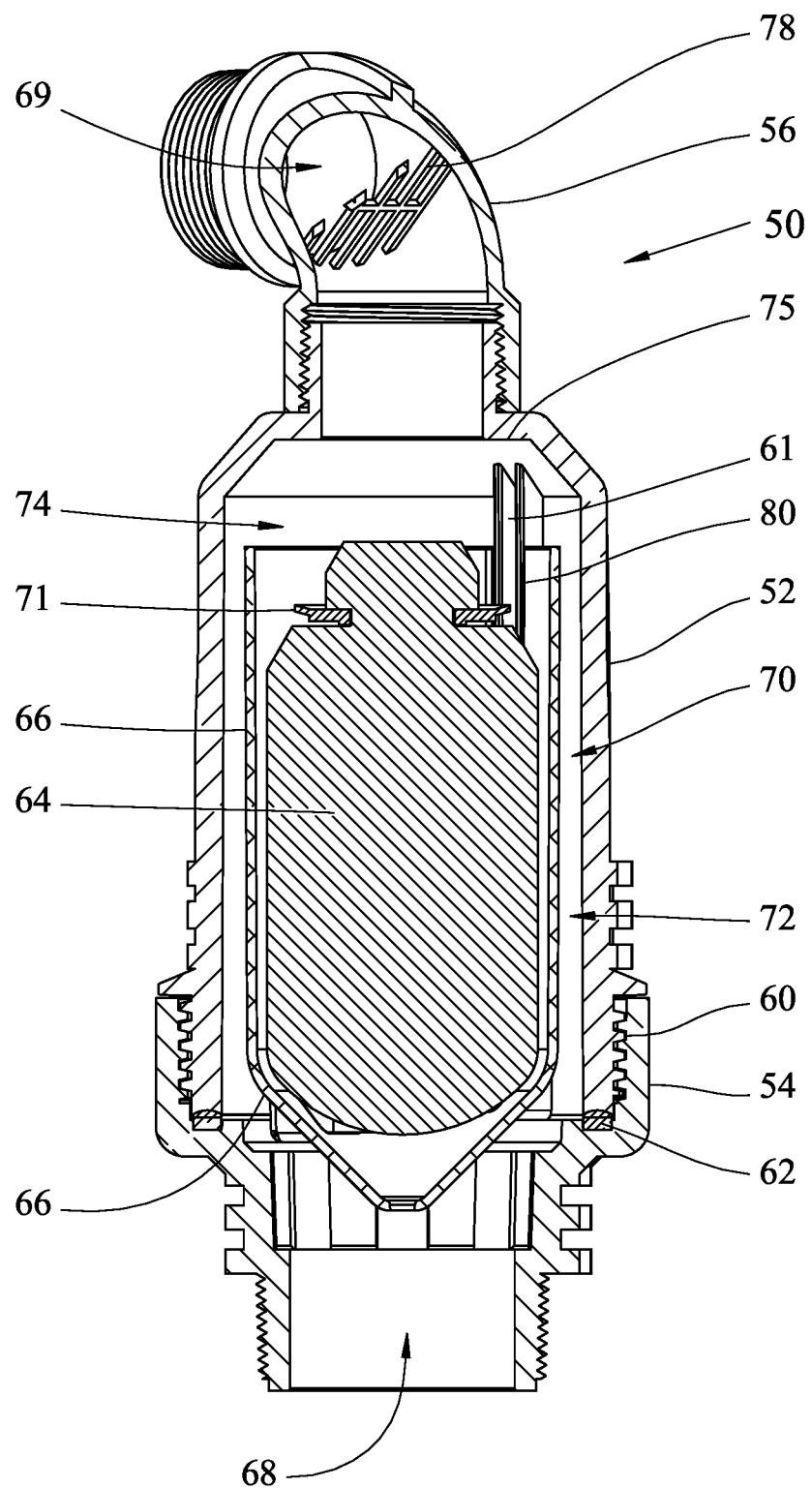
FIG. 7 is a section view of a second embodiment of a gas vent.

FIG. 7 illustrates a second embodiment of a gas vent in which the shield 66 is removable from the body and formed as a separate component from the body. The gas vent 50 has housing provided in three separable components: a body 52, a base 54, and a cap 56. The housing defines a float chamber 70. A seal 62 is positioned between the body and the base. A screen 78 is positioned within the cap to prevent unwanted material from entering the vent.

A float 64 is positioned within the shield 66 within the float chamber 70. The shield which is configured to deflect the flow of gas from the first port 68 past the shield to the second port 69 via channel or space 72. A float seal 71 is positioned on the float and configured to seat against seal seat 75 when the float is in a closed position.

The float has two opposing fins 58, 61 that travel in the opposing channels 61, 65 provided in the inner wall of the body. The shield has 66 opposing channels 80, 82 (82 shown in FIG. 10). The shield is configured such that the shield channels 80, 82 are positioned on the external walls of the channels provided in the inner wall of the body. The positioning of the shield channels serves to orient and maintain the shield in position in the float chamber. The shield is depicted with a conical first end and an open second end. The body of the shield is configured to circumvolve the float body when the float body is in the open position.

As in the first disclosed embodiment, as the liquid level increases in the float chamber, the float floats toward the outlet 69 causing the seal 71 to seat against the seal seat 75, preventing the outflow of fluid from the vent via the second port 69. Recirculation of gas caused by gas flowing past the open end of the shield in area 74 assists in retaining the float in the open position and avoiding premature closure.

Figure 8:
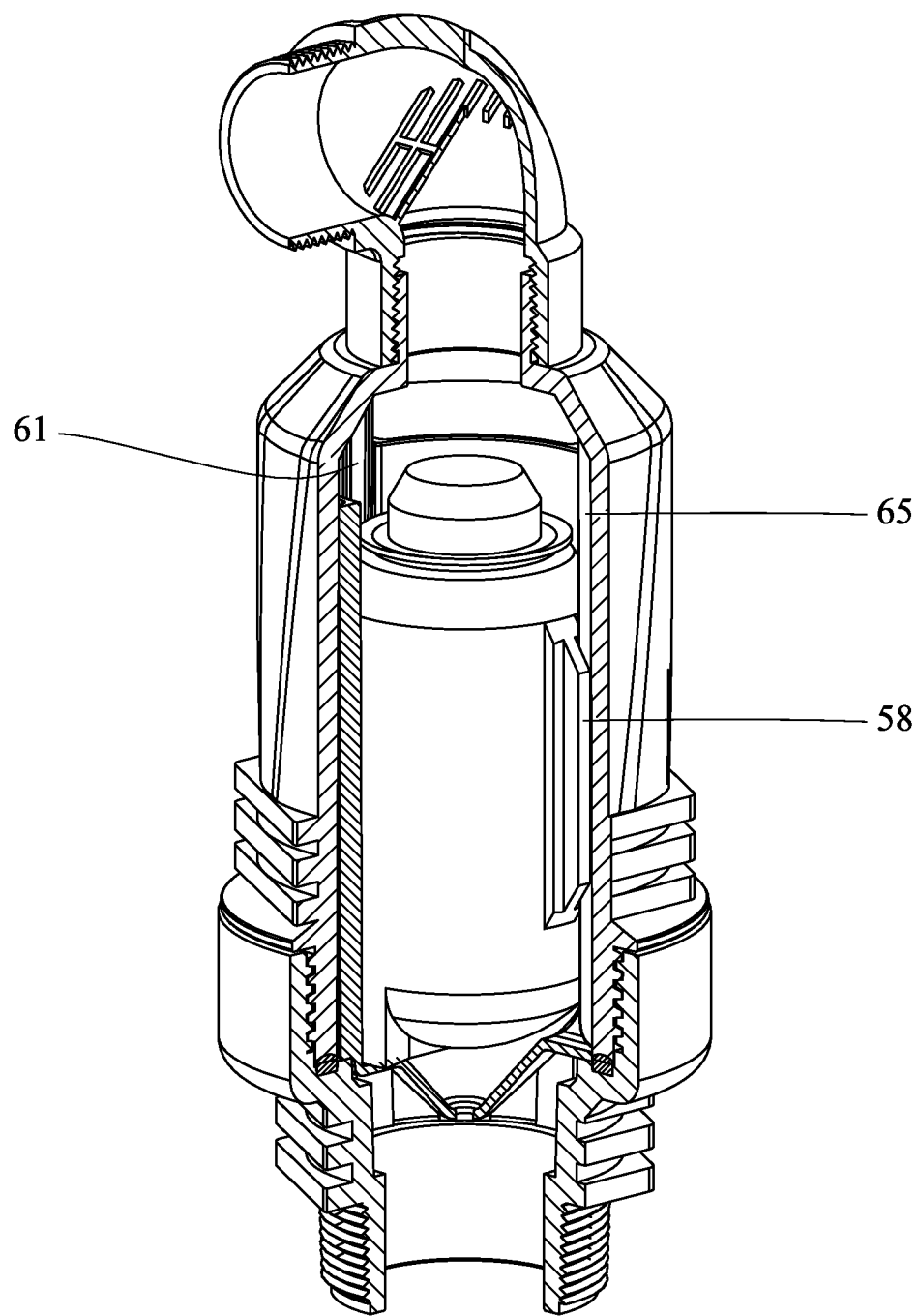
FIG. 8 is a partial section view of the gas vent of FIG. 7.
Figure 9:
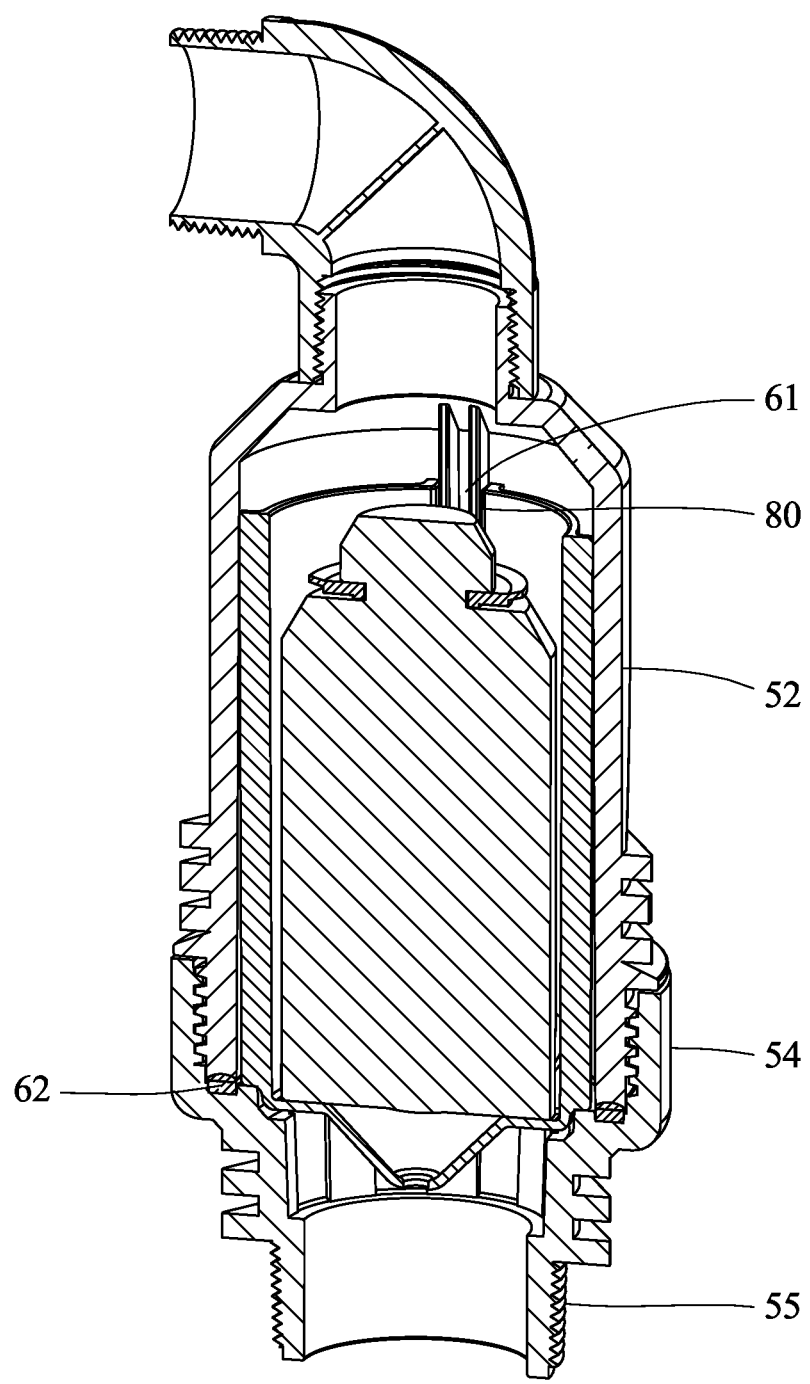
FIG. 9 is a section view of the gas vent shown in FIGS. 7-8.

FIGS. 8-9 illustrate partial section views of the vent of FIG. 7 to illustrate the positioning of the fins of the float relative to the channels in the shield and interior wall of the body of the vent. FIG. 8 illustrates the positioning of the fin 58 extending into channel 65 in the inner wall of the body. FIG. 9 illustrates the channel 80 of the shield positioned on the external walls of the channel 61 positioned on the interior of the body of the vent. The shield channel is located within the vent float chamber by positioning the channels of the shield onto the external walls of the channels of the interior of the interior of the body of the vent.

FIG. 9 illustrates a partial section view of the vent of FIGS. 7-8. Base 54 is configured for threaded attachment 55 to an irrigation line. An o-ring 62 is seated within a channel in the base 54. The shield is positioned within the body, with the float having fins 58 positioned within the opposing channels 61, 65 of the body to guide the float in its vertical movement. The removable shield 66 is aligned with the main body by channels 80, 82.

Figure 10:
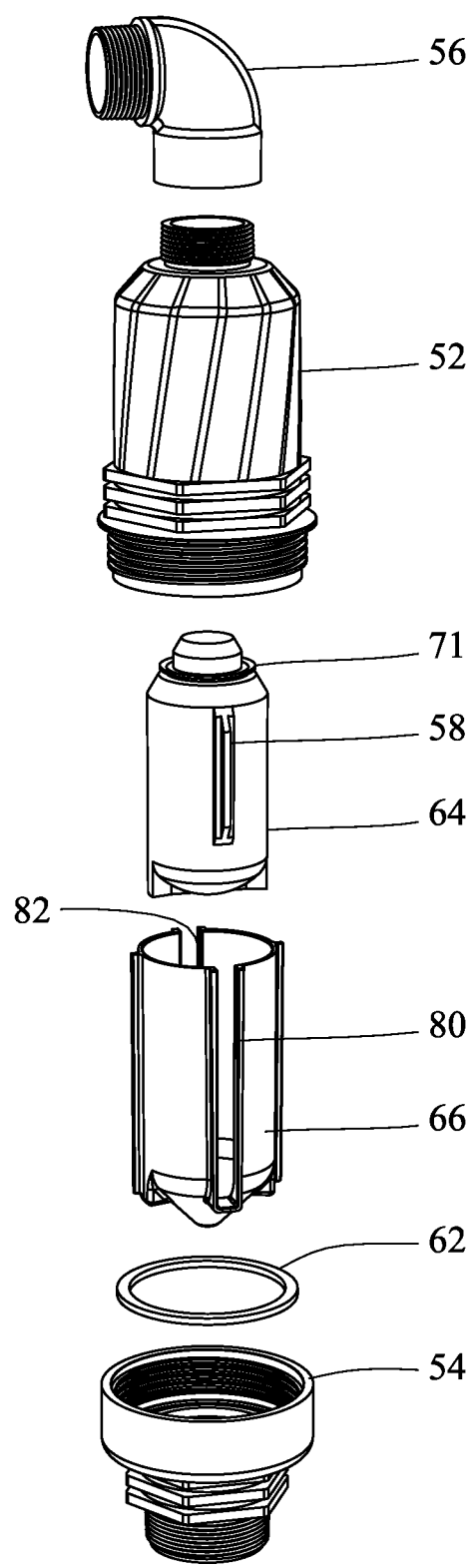
FIG. 10 is an exploded view of the gas vent shown in FIGS. 7-9.

FIG. 10 illustrates an exploded view of the float of FIGS. 7-9. The cap 56 is shown attaching to the body 52. The float 64 is illustrated having float seal 71 and fin 58, with opposing fin not shown. The shield 66 is formed with two opposing channels 80, 82, which are configured for positioning around the channels (not shown) of the interior of the body 52. The body 52 houses the float and shield. The body threadingly engages with the base 54. A seal 62 is provided between the body 52 and the base 54.

Figure 11:
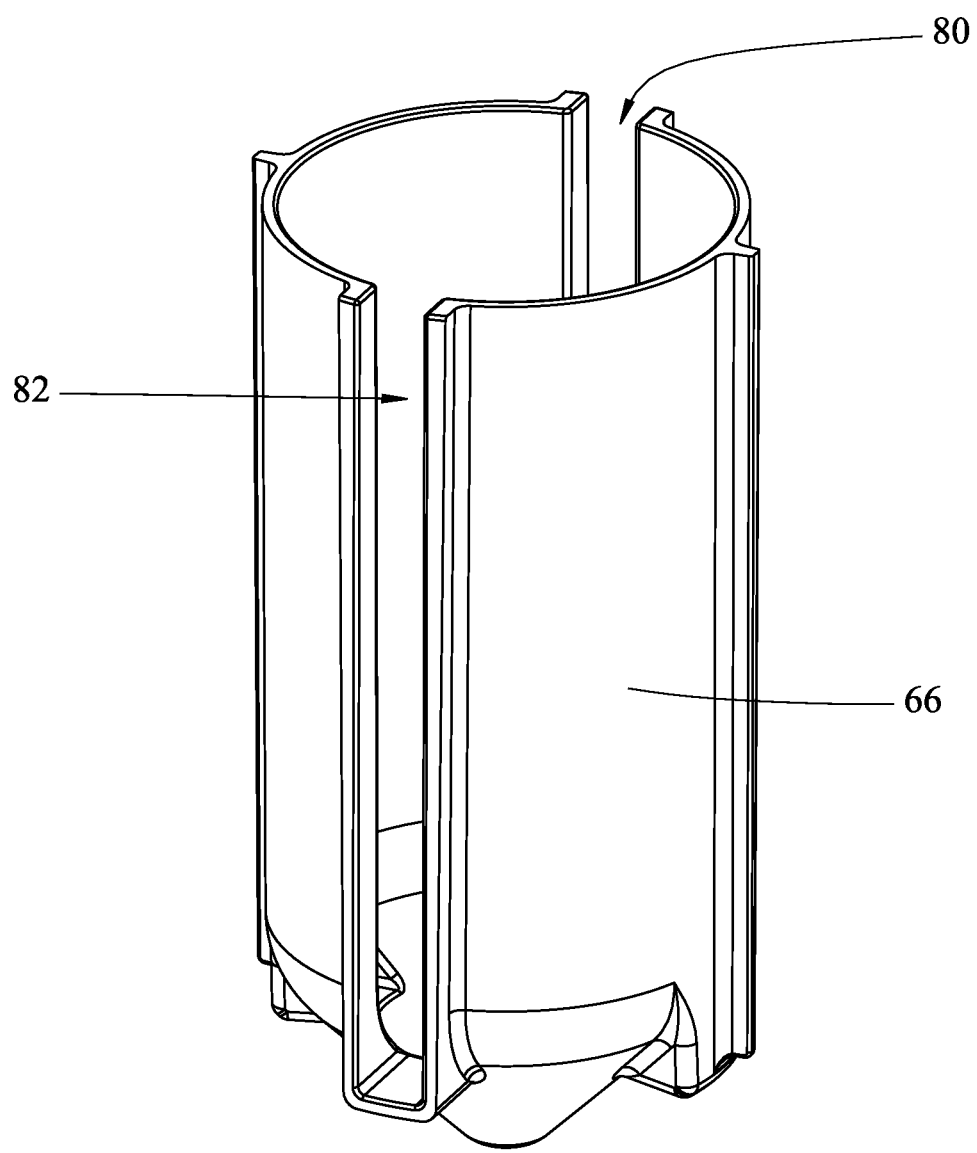
FIG. 11 is a perspective view of the shield illustrated in the gas vent of FIGS. 7-10.

FIG. 11 illustrates a perspective view of an embodiment of a removable shield 66. The shield has two opposing channels 80, 82 which are configured to mount around the channels 61, 65 of the interior wall of the body.

While certain preferred embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

We claim:

1. A gas vent valve for use with a pipeline, the pipeline defining an internal fluid flow path, said gas vent valve comprising:
   a housing, said housing defining a float chamber configured for fluid flow therethrough, said housing comprising a top end and a bottom end, wherein said bottom end defining a first port to said float chamber and said top end defining a second port to said float chamber, said bottom end being configured for attachment to the pipeline such that said float chamber is in fluid connection with the internal fluid flow path of the pipeline;
   a float, where said float is housed within the float chamber, said float configured to be axially displaceable within the float chamber between a closed position in which the float sealingly engages a sealing seat of the housing, and an open position in which said float is disengaged from said sealing seat, said float having a body and defining a length having a float first end and a float second end, wherein said float first end is positioned toward said first port, wherein said second end is positioned axially toward said second port;
   a shield positioned between said float and first port, wherein said shield comprises a substantially closed first end and an open second end, wherein said substantially closed first end of said shield is positioned between said float first end and said first port, wherein said shield extends around said body of said float toward said top end of said housing, wherein said shield is configured to prevent airflow from said first port from lifting said float into said closed position by directing gas flow from said first port past said body of said float to reduce drag by said gas flow on said body of said float, wherein an interior of said housing comprises two generally opposed body channels, wherein said float comprises two fins positioned on opposing sides of a body of said float, wherein said two fins are configured for travel in said two generally opposed body channels of said interior of said housing as said float is axially displaced in said float chamber; and
   wherein said float is configured to move from said open position to said closed position as a liquid level in the housing increases, wherein said float is configured to move from said closed position to said open position in response to liquid level in said housing decreasing.

2. The gas vent valve of claim 1, wherein said shield is integrally formed with said housing.

3. The gas vent valve of claim 1, wherein said housing comprises a central body and a cap, wherein said cap is threadingly connected to said central body.

4. The gas vent valve of claim 1, wherein said shield comprises a cylindrical shape, wherein said closed first end comprises a conical shape.

5. The gas vent valve of claim 1, wherein said shield is configured to be removable, wherein said shield comprises two generally opposed shield channels configured for placement on said two generally opposed body channels such that said two float fins pass through said two generally opposed shield channels into said two generally opposed body channels.

6. The gas vent valve of claim 1, wherein said body of said float comprises a cylindrical body, wherein shield is configured to circumvolve said length of said body of said float when said float is in said open position.

7. The gas vent valve of claim 1, wherein said shield extends beyond said float second end when said float is in said open position.

8. The gas vent valve of claim 1, wherein said float comprise a seal positioned at a first end of said float.

9. The gas vent valve of claim 8, wherein said seal comprises an o-ring.

10. The gas vent valve of claim 1, wherein said housing comprises a base and a central body, wherein said central body is threadingly engaged to said base, wherein said base comprises said bottom port.

11. The gas vent valve of claim 10, wherein said housing further comprises a cap threadingly engaged to said central body, wherein said cap comprises said top port.

* * * * *